United States Patent Office 2,840,550
Patented June 24, 1958

2,840,550
PROCESS FOR POLYMERIZING VINYL COMPOUNDS CONTAINING A BASIC NITROGEN ATOM

John A. Price, Stamford, and Walter M. Thomas, Noroton Heights, Conn., assignors to American Cyanamid Company, New York, N. Y., a corporation of Maine No Drawing. Application May 20, 1955
Serial No. 510,043

11 Claims. (Cl. 260—80.5)

The present invention relates to a process for improving the yield in the polymerization and copolymerization of basic monomers containing an unsaturated group.

An object of the invention is to provide an improved method for vinyl polymerization.

Another object of the invention is to provide an improved process for the catalytic polymerization of material containing a basic monomer having an unsaturated group.

A further object of the invention is to provide an improved catalytic process for copolymerizing mixtures of basic vinyl monomers with acrylic compounds in which a higher conversion is obtained.

Other objects and advantages of the invention will be apparent to those skilled in the art, especially upon consideration of the detailed disclosure hereinbelow.

It has been found that the conversion efficiency or yields obtained in polymerizing basic monomers containing an unsaturated group with a chlorate ion-sulfoxy ion catalyst system is surprisingly increased in the presence of nitrate ions. The expression "basic monomer" is used herein to include monomeric compounds containing an ethylenic group and a basic nitrogen atom; for example, primary, secondary and tertiary amines of the aliphatic, cycloaliphatic, aromatic or heterocyclic type, as well as similar quaternary ammonium compounds.

The invention, accordingly, comprises polymerizing a compound containing both a $>C=C<$ group and a basic nitrogen atom alone or with one or more basic or nonbasic monomers containing a similar unsaturated group in an acidic aqueous medium comprising nitrate ions, chlorate ions, and oxidizable sulfoxy ions of the group consisting of sulfite, bisulfite, hydrosulfite and thiosulfate ions. Narrower aspects of the invention relate to the proportions of various components of the catalyst, the use of unsaturated monomers containing a terminal ethylenic group, the use of comonomers containing acrylonitrile, and the preferred source materials for the aforesaid ions.

Acidic aqueous catalyst systems containing reducible chlorate ions and oxidizable sulfoxy ions have been employed with much success in the polymerization of various vinyl compounds, including vinyl chloride, acrylonitrile, vinyl acetate, etc. They have been found to be particularly suitable for the homo- and copolymerization of acrylonitrile into polymers of excellent characteristics for the manufacture of synthetic fibers. While the components of an oxidation-reduction or redox catalyst system of this nature may be introduced as chloric and sulfurous acid, these acids are relatively unstable; therefore, it is usually more convenient to add the desired ions to the polymerization system in the form of a water-soluble chlorate salt and a water-soluble sulfite salt, together with a suitable acid such as sulfuric acid, phosphoric acid, or acetic acid. For economy, sulfuric acid is usually selected.

During polymerization in an aqueous system containing a chlorate-sulfoxy catalyst combination, the chlorine is reduced and the sulfur simultaneously oxidized.

To obtain optimum results, it is recommended that the oxidizing and reducing components be present in oxidation and reduction equivalents; that is, 3 mols of sulfurous acid or a sulfite per mol of chloric acid or a chlorate. The ratio is the same for bisulfites, but only 1.5 mols of a metabisulfite salt is required since such salts ionize to form $HSO_3^-$ ions. By reason of having double the reduction potential of sulfites, only 1.5 mols of a thiosulfate or a salt of hydrosulfurous acid ($H_2S_2O_4$) is required per mol of chlorate to accomplish the same results. It should be understood that these proportions are not critcial and that it is possible to depart greatly from the ideal ratio, as for example by using equimolar amounts of sodium bisulfite and sodium chlorate or in charging 6 mols of the bisulfite per mol of the chlorate with no other disadvantage than a trivial waste of catalytic material. In general, it is recommended that the amount of chlorate ions introduced should be between about 0.01 and about 1.0% of the weight of the polymerizable monomeric material and that the sulfoxy ions be present in a quantity ranging between about 0.01 and about 3.0% by weight on the same basis. Larger amounts of the catalyst components, such as 3 or more percent of chlorate ions and 9 or more percent of sulfoxy ions, are operative; but they produce no additional benefits. When the polymerization medium contains nitrate ions, a distinct improvement in conversion is obtained in polymerizing monomers containing a $>C=C<$ group and a basic nitrogen atom and in copolymerizing one or more of such monomers with one or more other unsaturated compounds. Strangely enough, no appreciable improvement is produced by the nitrate ions in the polymerization of vinyl compounds of a nonbasic nature in the absence of the aforesaid basic monomers. The reason for these effects is not completely understood.

The present process is applicable to the polymerization of basic monomers alone or in the presence of other comonomers capable of addition polymerization. The unsaturated basic compound may constitute an extremely small amount of the total polymerizable matter present, as for instance as little as 0.5%, and still display a noticeable improvement in yield when polymerized in the presence of nitrate ions. In addition to a basic nitrogen atom, these basic monomers must contain one or more unsaturated double bonds; and this unsaturation may be either conjugated or unconjugated. The present process is particularly applicable to materials containing a single terminal ethylenic group; and these comprise the most significant materials which are subjected to vinyl or addition polymerization in commerce today. Moreover, outstanding results are obtained in the present process with compounds of this type. With the use of suitable pressure equipment, the new process can be employed with gaseous monomers, as well as those which are liquids or solids. Among the many suitable basic monomers are the vinyl pyridines such as 2-methyl-5-vinyl pyridine, 2-vinyl-5-ethyl pyridine, 4-vinyl pyridine, and 2-vinyl pyridine; allyl amines such as allylamine, diallylamine, and diallylmethyl amine; N-3-dimethylaminopropyl acrylamide, N-2-dimethylaminoethyl methacrylate, 2-vinyl-benzimidazole, N-vinylimidazole, N,N-dimethyl O-allyl-isourea, N-vinyl-N-ethyl guanidine, methacryloguanamine, acrylamido-propyl-benzyl dimethyl ammonium chloride, N-2-hydroxyethyl-2-vinyl pyridinium sulfate, dimethylaminoethyl fumarate, and N-3-cyclohexylaminopropyl acrylamide.

The process of the present invention is not only applicable to the homopolymerization of the above basic organic compounds but also to the copolymerization of two or more of them and also to the copolymerization of one or more of the basic monomers with one or more nonbasic compounds of the type described immediately below.

While the polymerization process described herein is especially applicable to the product of copolymers of acrylonitrile in major proportions, as for instance 50 to 95% by weight, with a minor proportion of a basic monomer, as for instance 5 to 15% by weight with or without other copolymerizable substances, it is by no means limited to these materials or proportions. They are merely polymers which have proven especially suitable for spinning into synthetic fibers having an excellent balance of properties, including dyeability. For this particular purpose, monomer charges containing 80 to 90% acrylonitrile, 5 to 10% 2-methyl-5-vinyl pyridine and 5 to 10% vinyl acetate have been highly recommended. A wide variety of conjugated and unconjugated substances containing a $>C=C<$ group and lacking a basic nitrogen atom are appropriate comonomers for the present process. Compounds having a single $CH_2=C<$ group are of especial importance since most of the commoner vinyl compounds of commerce fall into this class. The suitable comonomers include, inter alia, allyl alcohol, ethylene, styrene, the mono- and di-nuclear substituted methyl-, ethyl-, chloro-, nitro-styrenes, acrylic compounds generally, i. e. acrylic acid, methacrylic acid, the alkyl, aryl, and aralkyl esters of acrylic and methacrylic acids, the corresponding amides and mono-N-alkyl derivatives thereof, methacrylonitrile, etc., unsaturated ketones such as methyl vinyl ketone, miscellaneous vinyl compounds such as vinyl chloride, vinyl acetate, vinyl chloracetate, vinyl butyrate, vinyl stearate, etc., butadiene, vinylidene chloride, acrolein, diallyl phthalate, vinyl ethyl ether, various ethylenically unsaturated fluorine-containing compounds as exemplified by trifluorochloroethylene, diethyl fumarate, dimethyl maleate, and the like.

To achieve the benefits of this invention, it is essential that nitrate ions be present in the polymerization medium along with the chlorate and sulfoxy ions. Nitric acid may be used for the purpose or any of its inorganic salts since all such nitrates are water-soluble. Inasmuch as a pH between 1 and 5 is necessary in the polymerization reaction, and nitric acid has satisfactory stability in storage, the simplest and easiest way of charging the nitrate ions is in the form of nitric acid which also serves to adjust the pH to the proper value. This avoids introducing any foreign substances, such as the sulfate ions in sulfuric acid, which have no effect in promoting or catalyzing the reaction. In general, the quantity of nitrate ions may range from about 0.5 to about 80% of the total weight of polymerizable matter in the system, and quantities ranging from about 1 to about 20% are preferred. The necessary quantity of nitrate ions may be expressed in another way; that is, as equivalent to at least the amount of nitric acid required to produce a pH of from about 1 to 5 in a polymerization system containing the basic monomer, sodium or potassium chlorate and sodium or potassium bisulfite or another of the designated sulfoxy salts. This quantity will, of course, vary somewhat at any selected pH depending on the basicity of the particular unsaturated basic monomer. Additional nitrate ions may be introduced where desirable without materially affecting the pH by adding the nitrate salt of sodium, potassium, calcium, magnesium, aluminum, etc.

Polymerizations may be carried out in aqueous solutions, dispersions, or emulsions of the monomers. When preparing copolymers of acrylonitrile for fiber spinning according to the preferred embodiment of the invention, the polymerization should be carried out in aqueous solution or dispersion in the absence of any surface active agent to avoid the complications of removing such agent from the polymer before spinning. However, with water-insoluble monomers in other applications of this process, acid-stable emulsifiers or other surface active agents should be selected. Such surface active agents may be of the anionic type, as exemplified by sulfonated paraffin oil, alkylated naphthalene sulfonates, sodium lignosulfonate, the salts of long chain alkyl sulfates and sulfonates like sodium cetylsulfate and sodium lauryl sulfate, and the sodium, potassium, and amine soaps of long chain (12 to 22 carbon atoms) fatty acids. Cationic emulsifiers may also be used, as for instance, cetyl trimethyl ammonium bromide, benzyldimethyldodecyl ammonium chloride and dimethylhydroxyethylstearamido-propylammonium chloride.

The process described herein is suitable for both batch and continuous operations, and it is usually preferable to limit the amount of water introduced into a continuous polymerization system so that the total weight of polymerizable monomers is between about 15 and about 50% of the total material charged during the polymerization reaction. This is especially true when the polymerizable matter contains a substantial amount of acrylonitrile, as the resulting polymer suspension has excellent pumping characteristics, as well as outstanding drainage or filtering qualities. Additional economies are, of course, realized in processing and handling a smaller volume of the reaction mixture. No difficulties are encountered in respect to separation of the monomer since the polymerizable matter is charged at a rate correlated with the rate of polymerization in such a manner that the system is never saturated with monomeric acrylonitrile.

In the continuous polymerization of monomers containing a major proportion of acrylonitrile, the optimum pH has been found to be between about 1.8 and about 2.5, whereas the optimum for batch operations ranges from about 2.8 to about 3.5.

Relatively low polymerization temperatures, for example those ranging from about 20° C. to about 70° C., are desirable; and temperatures of about 30° to about 50° C. are particularly recommended.

It is desirable to conduct the process of the present invention in the absence of oxygen which has a definite inhibiting effect on the polymerization. Suitable inert gases such as nitrogen and carbon dioxide may be used to displace air in the reaction zone.

In some cases, the polymer or copolymer formed will precipitate out of solution substantially completely; in other cases, it may be desirable to add a precipitating or coagulating electrolyte such as sodium chloride, sodium sulfate, aluminum sulfate, hydrochloric acid, calcium chloride, etc., to the reaction mixture. When coagulated by this or any other means, the polymer is readily filtered from the liquid medium, washed and dried.

Fillers, dyes, pigments, plasticizers, other resins, both natural and synthetic, and the like may be incorporated with the polymers and copolymers either before, during or after polymerization to render the products more suitable for whatever use they are to be put, i. e., molding and surface coating compositions, adhesives, fibers, etc.

For the preparation of acrylonitrile polymers or copolymers to be used in the preparation of spun fibers, a uniform molecular weight of between about 60,000 and about 90,000 has been found to be most desirable. It is an advantage of the new process that by continuous addition of the catalyst system a uniform average polymer molecular weight can be attained.

For a better understanding of the nature and objects of the present invention, reference should be had to the following illustrative examples in which all proportions are stated in terms of weight on an anhydrous basis unless otherwise indicated therein. For example, the acid contents of various solutions and feed streams are expressed for simplicity as anhydrous or 100% $HNO_3$ and $H_2SO_4$, even though aqueous nitric and sulfuric acids are actually employed. In order to provide fair comparisons of the effects produced by the introduction of the nitrate ions, it has been necessary to employ relatively few monomer and comonomer compositions with limited variation of the catalyst concentrations and other reaction conditions. Accordingly, the examples are not to be interpreted as attempting to set forth any ranges of reaction conditions or of suitable monomers.

EXAMPLE I

A reaction vessel, equipped with a stirrer, reflux condenser, thermometer and gas inlet tube, is placed in a constant temperature bath which is maintained at 40° C. To the vessel is added a solution of 95.4 parts of acrylonitrile, 5.3 parts of 2-methyl-5-vinyl pyridine, 5.3 parts of vinyl acetate, 950 parts of demineralized water and 2.76 parts by weight of $HNO_3$. The pH of the initial solution is 3.2. A rapid stream of pre-purified nitrogen is passed over the surface of the solution for 30 minutes, and then is reduced to 2 or 4 bubbles per second. A solution of 0.440 part of sodium chlorate and 1.575 parts of sodium sulfite in 100 parts of water is made up. A second solution is prepared by adding 1.17 parts of $HNO_3$ to 100 parts of water. Portions of these solutions are added at 25-minute intervals to the reaction vessel over a period of 2½ hours. The polymerization is continued for a total period of four hours. At the end of this time the product is collected on a Büchner funnel, and it is washed with 2000 parts of demineralized water. The polymer is dried in an oven at 70° C. for about 16 hours. The yield of dry white polymer of acrylonitrile, 2-methyl-5-vinyl pyridine and vinyl acetate amounts to 77 parts which represents a 73% conversion.

Comparative Example A

The same conditions and quantities are used as in Example I, except that the 2.76 parts of $HNO_3$ used in the initial charge is replaced with 2.175 parts of $H_2SO_4$ and the pH of the mixture is 3.2. Also, the 1.17 parts of $HNO_3$ in the acid feed is replaced with 0.91 part of $H_2SO_4$. In this case, the yield of dry, white tripolymer of acrylonitrile, 2-methyl-5-vinyl pyridine, and vinyl acetate amounts to 70 parts which represents a 66% conversion or a relative yield of about 10% less than with nitric acid.

Comparative Example B

Example I is repeated in all respects except for a different monomer charge which consists of 100.7 parts of acrylonitrile and 5.3 parts of methyl acrylate with no basic comonomer present. The pH of the reaction mixture is between 2.9 and 3.2. The yield of dry white copolymer of acrylonitrile and methyl acrylate amounts to 92 parts which is equivalent to an 87% conversion.

Comparative Example C

Example B is duplicated exactly except for the substitution of 2.175 parts of $H_2SO_4$ for the nitric acid in the initial charge and 0.91 part of $H_2SO_4$ for the nitric acid in the catalyst solution. Again, a yield of 92 parts of acrylonitrile-methyl acrylate copolymer is obtained which indicates that the improvement obtained with nitric acid is specific to recipes containing basic monomers.

EXAMPLE II

Exactly the same procedure is followed as described in Example I with the exception that 10.6 parts of sodium nitrate is also added to the reaction vessel along with the initial charge. Here, the initial pH is 3.2. The yield of dry white copolymer of acrylonitrile, 2-methyl-5-vinyl pyridine, and vinyl acetate amounts to 83 parts which represents a 78% conversion.

Comparative Example D

This example illustrates the preparation of a ternary polymer from a mixture of 90% acrylonitrile, 5% 2-methyl-5-vinyl pyridine, and 5% vinyl acetate by weight. The copolymerization is effected continuously, using apparatus which includes a reaction vessel provided with an overflow tube located at the top. Agitation is effected primarily by circulating the contents of the reaction vessel continuously through a high-speed centrifugal pump. Additional stirring in the reaction vessel is effected by means of a motor-driven propeller. The temperature is regulated by means of a heat exchanger located in the external circulating system. The solutions of monomeric material and of acid and catalyst hereafter described are fed into the reaction vessel using variable-speed pumps.

The reactor is charged with a previously prepared 28% aqueous slurry of a two-component copolymer of about 95% acrylonitrile and 5% methyl acrylate. The following solutions are then fed in simultaneously at the indicated rates.

|  | Parts per hour |
|---|---|
| Feed 1: |  |
| Sodium chlorate | 3.78 |
| Sodium sulfite | 13.4 |
| Demineralized water | 1060.0 |
| Feed 2: |  |
| Acrylonitrile | 774.0 |
| 2-methyl-5-vinyl pyridine | 43.0 |
| Vinyl acetate | 43.0 |
| Feed 3: |  |
| $H_2SO_4$ | 23.7 |
| Ferrous sulfate | 0.0224 |
| Demineralized water | 1050.0 |

The temperature of the slurry is maintained at 40° C., and the average pH is about 2.2. The residence or average holding time is 2 hours, and the copolymerization reaction is stopped at the end of 5 hours. The ternary polymer is isolated from the final reactor slurry by centrifuging; then it is washed in the centrifuge with 40,000 parts of demineralized water and dried in an oven at 70° C. for about 16 hours. The weight of dry, white ternary polymer of acrylonitrile, 2-methyl-5-vinyl pyridine, and vinyl acetate amounts to 1100 parts which represents a 64% conversion.

EXAMPLE III

Example D is repeated using the following feeds which differ chiefly in the substitution of nitric acid for sulfuric acid. The same equipment is employed, and the product slurry left in the reactor from Example D serves to seed the present reaction.

|  | Parts per hour |
|---|---|
| Feed 1: |  |
| Sodium chlorate | 3.73 |
| Sodium sulfite | 13.3 |
| Demineralized water | 1180.0 |
| Feed 2: |  |
| Acrylonitrile | 774.0 |
| Vinyl acetate | 43.0 |
| Feed 3: |  |
| 2-methyl-5-vinyl pyridine | 43.0 |
| $HNO_3$ | 27.1 |
| Ferrous sulfate | 0.0232 |
| Demineralized water | 940.0 |

Again the temperature of the slurry is maintained at 40° C., and the average pH is 2.2. At the end of 5 hours, the reactor slurry is isolated, washed and dried in the same manner as described in the preceding example. The small amount of iron present as ferrous sulfate is helpful in maintaining a "fluid" slurry which can be pumped despite its high concentration of solids. The yield of dry, white ternary polymer of acrylonitrile, 2-methyl-5-vinyl pyridine, and vinyl acetate amounts to 1340 parts which represents a 78% conversion, a relative improvement of 22% over the yield in Example D.

EXAMPLE IV

The ternary polymer of Example D is prepared in exactly the same manner using the following feeds:

| | Parts per hour |
|---|---|
| Feed 1: | |
| Sodium chlorate | 4.47 |
| Sodium sulfite | 15.9 |
| Demineralized water | 1060.0 |
| Feed 2: | |
| Acrylonitrile | 774.0 |
| 2-methyl-5-vinyl pyridine | 43.0 |
| Vinyl acetate | 43.0 |
| Feed 3: | |
| HNO$_3$ | 22.1 |
| Demineralized water | 1050.0 |

The overall pH of the reaction is substantially 2.1. The yield of dry white ternary polymer of acrylonitrile, 2-methyl-5-vinyl pyridine and vinyl acetate amounts to 1460 parts which represents a conversion of 85%.

EXAMPLE V

Exactly the same procedure is followed as described in Example IV with the exception that 18.4 parts of sodium nitrate is also added to Feed 3. The yield of dry white polymer of acrylonitrile, 2-methyl-5-vinyl pyridine and vinyl acetate amounts to 1560 parts which represents a 91% conversion.

EXAMPLE VI

This example illustrates the preparation of a ternary polymer containing by weight about 88.5% acrylonitrile, 6.5% 2-methyl-5-vinyl pyridine, and 5.0% vinyl acetate units following the procedure of Example D in general.

| | Parts per hour |
|---|---|
| Feed 1: | |
| Sodium chlorate | 7.3 |
| Sodium sulfite | 26.0 |
| Demineralized water | 1030.0 |
| Feed 2: | |
| Acrylonitrile | 850.0 |
| Vinyl acetate | 75.0 |
| Feed 3: | |
| 2-methyl-5-vinyl pyridine | 75.0 |
| HNO$_3$ | 48.5 |
| Ferrous sulfate | 0.0256 |

The temperature of the slurry is maintained at 50° C. After 6 hours of running, equilibrium conditions are established with the pH at about 2.0 and the slurry is collected at 2-hour intervals for the next 18 hours. The polymer from each batch of slurry is isolated, washed and dried in the same manner as before. The average conversion for the 18-hour period amounts to 84%.

EXAMPLE VII

Example VI is repeated in general with the following feeds:

| | Parts per hour |
|---|---|
| Feed 1: | |
| Sodium chlorate | 6.2 |
| Sodium sulfite | 22.3 |
| Demineralized water | 1030.0 |
| Feed 2: | |
| Acrylonitrile | 850.0 |
| Vinyl acetate | 75.0 |
| Feed 3: | |
| 2-methyl-5-vinyl pyridine | 75.0 |
| HNO$_3$ | 43.8 |
| Sodium nitrate | 19.4 |
| Ferrous sulfate | 0.0256 |

The temperature of the slurry is maintained at 50° C. and the pH again is about 2.0. After 6 hours of running, equilibrium conditions are established, and the slurry is collected, washed and dried at 2-hour intervals for the next 18 hours. The average conversion for the 18-hour period amounts to 94%.

EXAMPLE VIII

To a reaction vessel equipped as in Example I are added 46.8 parts of N-3-dimethylaminopropyl acrylamide, 950 parts of demineralized water and 19 parts of HNO$_3$. The pH of the initial solution is about 3.0. A rapid stream of pre-purified nitrogen is passed over the surface of the solution for 30 minutes, and is then reduced to 2 or 4 bubbles per second. A solution of 0.880 part of sodium chlorate and 3.15 parts of sodium sulfite in 100 parts of water is made up. A second solution is prepared by adding 2.40 parts of HNO$_3$ to 100 parts of water. Portions of these solutions are added at 25-minute intervals to the reaction vessel over a period of 2½ hours. The polymerization is continued for a total period of four hours at 40° C. At the end of this time, the viscosity of the solution is substantially greater than at the start indicating that most of the N-3-dimethylaminopropyl acrylamide nitrate has polymerized to a water-soluble polymer.

While there are above disclosed but a limited number of embodiments of the process herein presented, it is possible to produce still other embodiments without departing from the inventive concept herein disclosed.

What we claim is:

1. A process which comprises polymerizing a compound containing both a >C=C< group and a basic nitrogen atom selected from the group consisting of vinyl pyridines, alkyl vinyl pyridines, quaternary ammonium derivatives of said pyridines, mono- and di-allylamine, lower alkyl mono- and di-allylamines, aminoalkyl acrylates and aminoalkyl acrylamides in an aqueous solution of pH between about 1 and about 5 comprising nitrate ions, chlorate ions, and oxidizable sulfoxy ions of the group consisting of sulfite, bisulfite, and hydrosulfite and thiosulfate ions.

2. A process according to claim 1 in which said compound is copolymerized with a comonomer containing a >C=C< group and free of basic nitrogen atoms.

3. A process according to claim 1 in which said compound is copolymerized with acrylonitrile.

4. A process which comprises polymerizing a compound containing both a >C=C< group and a basic nitrogen atom selected from the group consisting of vinyl pyridines, alkyl vinyl pyridines, quaternary ammonium derivatives of said pyridines, mono- and di-allylamine, lower alkyl mono- and di-allylamines, aminoalkyl acrylates and aminoalkyl acrylamides in an aqueous solution of pH between about 1 and about 5 comprising at least about 0.5 percent nitrate ions, at least about 0.01 percent chlorate ions, and at least about 0.01 percent oxidizable sulfoxy ions of the group consisting of sulfite, bisulfite, hydrosulfite and thiosulfate ions based upon the weight of polymerizable material.

5. A process according to claim 4 in which said compound is copolymerized with a comonomer containing a >C=C< group and free of basic nitrogen atoms.

6. A process according to claim 4 in which said compound is copolymerized with acrylonitrile.

7. A process which comprises polymerizing a compound containing both a CH$_2$=C< group and a basic nitrogen atom selected from the group consisting of vinyl pyridines, alkyl vinyl pyridines, quaternary ammonium derivatives of said pyridines, mono- and di-allylamine, lower alkyl mono- and di-allylamines, aminoalkyl acrylates and aminoalkyl acrylamides at a temperature between about 20 and about 70 degrees centigrade in an aqueous solution of pH between about 1 and about 5 comprising between about 0.5 and about 80 percent nitrate ions, between about 0.01 and about 3 percent chlorate ions, and between about 0.01 and about 9 percent oxidizable sulfoxy ions of the group consisting of sulfite, bisulfite, hydrosulfite and thiosulfate ions based upon the weight of polymerizable material.

8. A process according to claim 7 in which said compound is copolymerized with a comonomer containing a $CH_2=C<$ group and free of basic nitrogen atoms.

9. A process according to claim 7 in which said compound is copolymerized with acrylonitrile.

10. A process which comprises polymerizing a major proportion of acrylonitrile and a minor proportion of a vinyl pyridine at a temperature between about 20 and about 70 degrees centigrade in an aqueous solution comprising between about 0.01 and about 1.0 percent of chlorate ions from an alkali metal chlorate, between about 0.01 and about 3.0 percent of sulfoxy ions from an alkali metal salt of sulfurous acid based upon the weight of polymerizable material and sufficient nitric acid to produce a pH between about 1 and about 5 in the solution.

11. A process according to claim 10 in which the polymerizable material charged comprises about 80 to about 90 percent by weight of acrylonitrile, about 5 to about 10 percent 2-methyl-5-vinyl pyridine and about 5 to 10 percent vinyl acetate.

References Cited in the file of this patent
UNITED STATES PATENTS

| | | |
|---|---|---|
| 2,648,647 | Stanton | Aug. 11, 1953 |
| 2,673,192 | Hill | Mar. 23, 1954 |